(12) United States Patent
Schloss et al.

(10) Patent No.: US 8,046,450 B1
(45) Date of Patent: Oct. 25, 2011

(54) ASSOCIATING NETWORK PORTS OF A COMPUTER SYSTEM WITH NETWORK PORTS OF A NETWORK DEVICE

(75) Inventors: Rheid Schloss, Fort Collins, CO (US); Brian J O Keefe, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 177 days.

(21) Appl. No.: 12/403,877

(22) Filed: Mar. 13, 2009

(51) Int. Cl.
*G06F 15/16* (2006.01)
(52) U.S. Cl. .............................. 709/223; 709/220; 713/2
(58) Field of Classification Search .......... 709/220–223; 713/1, 2
See application file for complete search history.

(56) References Cited

U.S. PATENT DOCUMENTS

| | | | |
|---|---|---|---|
| 7,472,179 B2 * | 12/2008 | Tarui et al. | 709/223 |
| 2006/0120297 A1 | 6/2006 | Hamedi et al. | |
| 2006/0209852 A1 | 9/2006 | Wakumoto et al. | |
| 2007/0283045 A1 | 12/2007 | Nguyen et al. | |
| 2008/0270588 A1 | 10/2008 | Sultan et al. | |
| 2008/0276004 A1 | 11/2008 | Thomson et al. | |

OTHER PUBLICATIONS

Microsoft Corp., Boot from SAN in Windows Server™ 2003 and Windows® 2000 Server, Dec. 2003, pp. 1-25.

* cited by examiner

*Primary Examiner* — David Lazaro

(57) ABSTRACT

Network ports of a computer system are associated with network ports of a network device. Network ports of the computer system are configured to operate as part of a switch. A discovery agent discovers network ports of the network device to which the network ports of the computer system are coupled. Associations are created between the network ports of the computer system and the network ports of the network device.

15 Claims, 5 Drawing Sheets

US 8,046,450 B1

ASSOCIATING NETWORK PORTS OF A COMPUTER SYSTEM WITH NETWORK PORTS OF A NETWORK DEVICE

BACKGROUND

In large data centers and other computer installations, computers are often initially deployed in a "bare metal" state in which an operating system is not installed on the computer. It is desirable to automate the configuration of a bare metal computer to minimize manual configuration steps required by a data center technician. Often a bare metal computer will be configured to obtain in interne protocol (IP) address from a dynamic host configuration protocol (DHCP) server, and initially boot by loading an operating system from a preboot execution environment (PXE) server. Thereafter, the operating system loaded from the PXE server performs additional configuration steps, such as formatting the local hard drive and installing a local copy of an operating system. However, additional manual configuration steps often remain.

BRIEF DESCRIPTION OF THE DRAWINGS

The Figures depict embodiments, implementations, and configurations of the invention, and not the invention itself.

DETAILED DESCRIPTION

Figure 1:
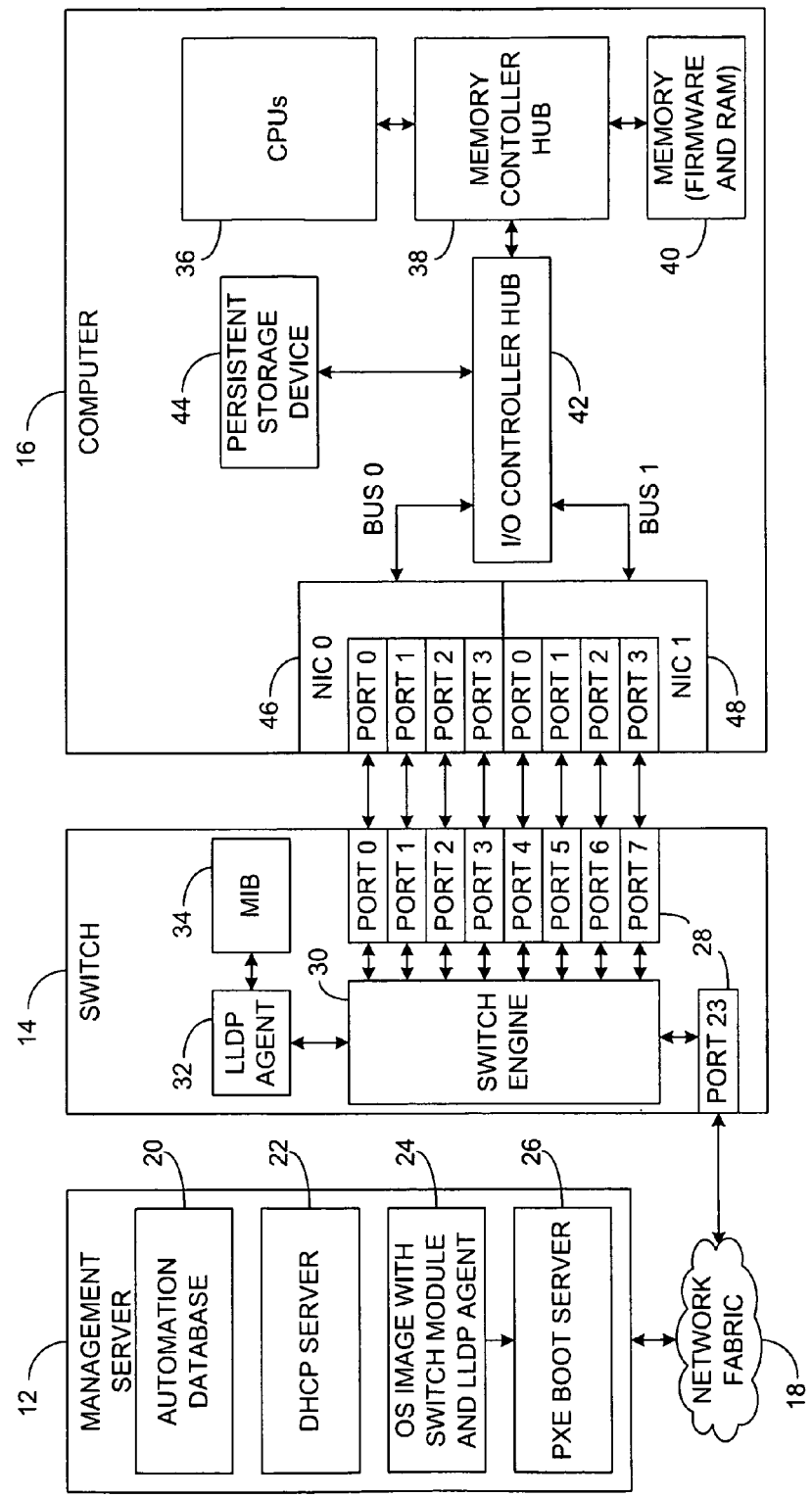
FIG. 1 shows an exemplary network environment in accordance with embodiments of the present invention.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

Embodiments of the present invention relate to discovering associations between network ports of a computer and the network ports of a network switch to which the computer network ports are coupled. As discussed above in the Background section, computer systems deployed in data centers are often initially deployed in a "bare metal" state in which an operating system has not been installed on a local hard drive of the computer system. Typically, such a computer will have more than one network interface controller (NIC), with each NIC having one or more Ethernet ports. When the bare metal computer boots for the first time, firmware routines discover all devices, including NICs, by performing bus scans, as is known in the art. Thereafter, the firmware routines will initialize a single Ethernet port of a single NIC for communication, and boot the computer using PXE, as described above. Alternatively, the bare metal computer may be configured to boot from a storage area network (SAN) via a disk array, or other storage device, coupled to the SAN. Initially, the other Ethernet ports are not used.

A management server must have associations between all Ethernet ports of the computer system, and the ports of a network switch to which the computer system ports are coupled, to fully configure and provision the computer system. In the past, these associations have been gathered manually by booting each server and obtaining the media access control (MAC) address of each Ethernet port, and following the network cabling from each Ethernet port to a corresponding port on the network switch. After gathering the associations, the data is then manually entered into an automation database of the management server so that automated provisioning of the computer system can continue.

Embodiments of the present invention automate this task. In accordance with embodiments of the present invention, a computer is booted using an operating system having a switch module and a discovery agent. The operating system is provided from a remote device, such as a PXE boot server with an image of the operating system stored thereon, or a SAN storage device with an image of the operating system stored thereon. The computer then configures a plurality of Ethernet ports of the computer to function as a network switch, and activates a discovery agent, which discovers network associations between the computer's ports and the ports of one or more network switches. After the associations have been discovered, the computer shuts down the switch module, establishes communication with the management server, and transmits the associations to the management server. Thereafter, the management server provisions the computer system.

Figure 5:
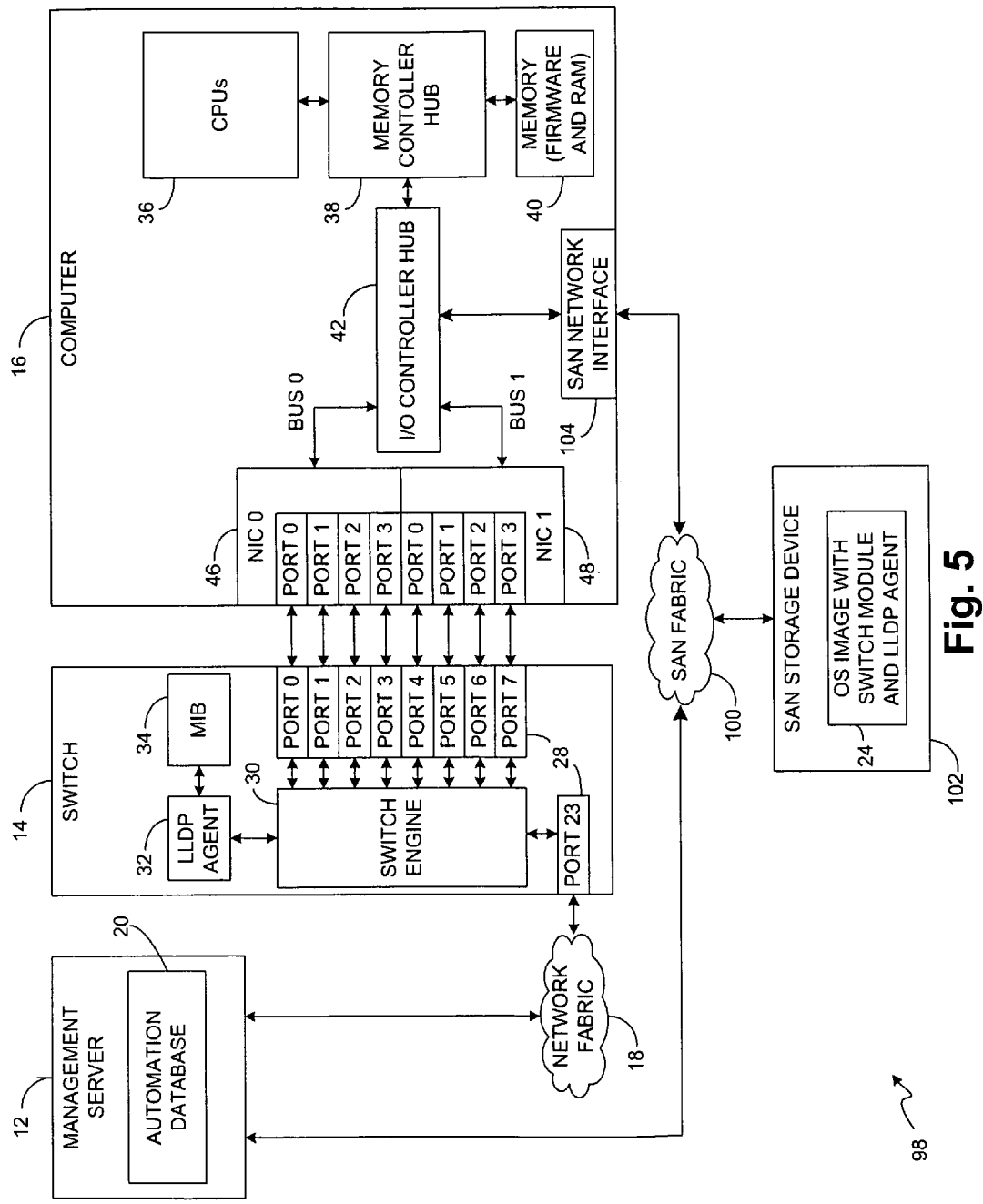
FIG. 5 shows another exemplary network environment in accordance with embodiments of the present invention.

Embodiments of the present invention will first be described with reference to a PXE boot server that provides the operating system. In FIG. 5, an embodiment will be discussed showing the operating system provided by a SAN storage device.

FIG. 1 shows an exemplary network environment 10 in which embodiments of the present invention may be deployed. Environment 10 is merely representative, and those skilled in the art will recognize that the present invention may be used in other configurations and environments.

Environment 10 includes a management server 12, a switch 14, and a computer 16. Network fabric 18 represents any network topology coupling management server 12 to switch 14.

Management server 12 includes automation database 20, DHCP server 22, OS image with switch module and LLDP agent 24, and PXE boot server 26. For simplicity, these functions are shown in a single server. However, those skilled in the art will recognize that these functions may be distributed among multiple servers.

Automation database 20 stores network topology of the network environment that it serves, such as the switch/computer associations discovered by embodiments of the present invention. DHCP server 20 responds to IP address requests from network clients seeking an IP address. OS image with switch module and LLDP agent 24 is an image of an OS to be executed by a bare metal computer. Finally, PXE boot server 26 responds to PXE boot requests from a client, and serves OS image with switch module and LLDP agent 24 to the client.

Switch 14 is a 24-port network switch. However, those skilled in the art will recognize that switch 14 may have any number of ports. Furthermore, multiple switches may be used to couple computer 16 to network fabric 18. Switch 14 includes ports 28, switch engine 30, LLDP agent 32, and management information base (MIB) 34. For simplicity, only ports 0-7 and 23 of ports 28 are shown. Switch engine 30 is coupled to ports 28, and functions as network switches known in the art by discovering MAC address serviced by each port, and routing Ethernet packets between ports 28 based on MAC addresses.

LLDP agent 32 implements the Link Layer Discovery Protocol for switch 14. LLDP is a vendor-neutral Layer 2 protocol that allows a network device to advertise its identity and capabilities on the local network, and was ratified as IEEE standard 802.1AB-2005. LLDP frames are sent at each port by an LLDP agent. An LLDP frame contains a Link Layer Discovery Protocol Data Unit (LLDPDU), which in turn may transport a set of type-length-value (TLV) structures. By exchanging TLV structures, devices coupled to a network and having LLDP agents are able to discover a series of parameters associated with neighboring devices, such as system name and description, port name and description, VLAN name, IP management address, system capabilities (switching, routing, etc.), MAC/PHY information, MDI power information, and link aggregation. Information discovered using LLDP is stored in a management information base (MIB), such as MIB 34 of switch 14.

Note that other discovery protocols are known in the art, and embodiments of the present invention may use other discovery protocols. For example, the Cisco Discovery Protocol (CDP), the Extreme Discovery Protocol (EDP), the Nortel Discovery Protocol (NDP) (formerly known as the SynOptics Network Management Protocol (SONMP)), the Foundry Discovery Protocol (FDP), and the Enterasys Discovery Protocol (EDP) (formally known as the Cabletron Discovery Protocol (CDP)) are all proprietary Layer 2 discovery protocols. Any of these protocols may be used with embodiments of the present invention. Furthermore, it may be desirable for embodiments of the present invention to support multiple discovery protocols to maximize the number of network devices supported.

Computer 16 represents a computer that will execute embodiments of the present invention to discover associations between ports of computer 16 and ports 28 of switch 14. As mentioned above, computer 16 may represent a computer that has arrived at a data center in a bare metal state without an installed operating system. However, computer 16 may also be a fully configured computer, with embodiments of the present invention employed to discover, or rediscover, network associations.

Computer 16 includes one or more CPUs 36, a memory controller hub 38, memory (firmware and RAM) 40, I/O controller hub 42, one or more persistent storage devices 44, NIC 0 46, and NIC 1 48. CPUs 36 process program instructions and data stored in memory 40. Memory 40 represents persistent data, such as firmware stored in an electrically erasable programmable read-only memory (EEPROM), and program instructions and data stored in random-access memory (RAM) while computer 16 is operating.

Note that CPUs 36 and memory 40 are both coupled to memory controller hub 38, which in turn is coupled to I/O controller hub 42. Memory controller hub 38 and I/O controller hub 42 are sometimes known in the art as a northbridge and a southbridge, respectively. Memory controller hub 38 and I/O controller hub 42 are merely representative, and those skilled in the art will recognize that other configurations may be used.

I/O controller hub 42 is coupled to memory controller hub 38 and persistent storage devices 44. Persistent storage devices 44 represent one or more devices for storing program instructions and data. Those skilled in the art will recognize that persistent storage devices may include hard drives, solid state drives, EEPROMs, optical drives, tape devices, and the like. In another embodiment, computer 16 may be a disk-less client, with all persistent data stored in a remote persistent storage device, such as SAN storage device 102, which is discussed below with reference to FIG. 5. In this embodiment, persistent storage devices 44 may be replaced by a non-persistent storage device, such as a RAM disk, for storing program instructions and data while computer 16 is operating.

Hub 42 also provides bus 0 and bus 1, which may be PCI buses, PCI Express buses, PCI-X buses, or other bus types known in the art. Bus 0 is coupled to NIC 0 46, and bus 1 is coupled to NIC 1 48. Each NIC has four ports. With ports 0, 1, 2, and 3 of NIC 0 46 coupled via network cables to ports 0, 1, 2, and 3, respectively, of switch 14, and ports 0, 1, 2, and 3 of NIC 1 48 coupled via network cables to ports 4, 5, 6, and 7, respectively, of switch 14.

Figure 2:
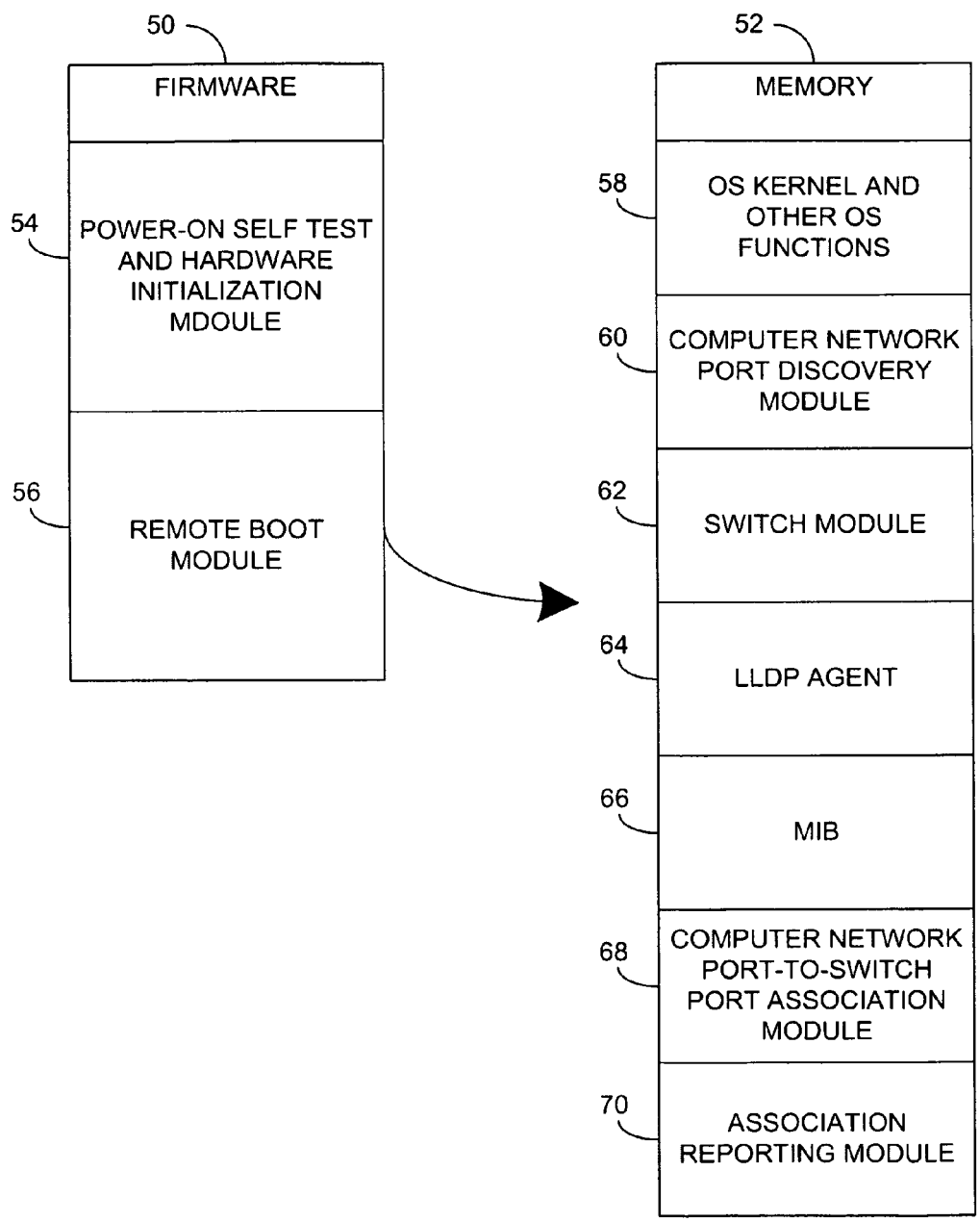
FIG. 2 shows software modules stored in memory and storage media of computer systems shown in FIG. 1, in accordance with embodiments of the present invention.

FIG. 2 shows software modules stored in memory 40 of computer 16 of FIG. 1. Firmware 50 of memory 40 is accessed when computer 16 is booted. Firmware 50 includes power-on self test and hardware initialization module 54, and remote boot module 56. In one embodiment, remote boot module 56 performs a PXE boot operation. In another embodiment discussed below with reference to FIG. 5, remote boot module 56 boots from a remote SAN storage device.

When computer 16 is booted, hardware initialization module 54 performs a power-on self test, and initializes hardware. Typically, the initialization will include scanning hardware, and will populate tables storing parameters such as bus number, device number, function number, and register number of all hardware discovered during the scan. For example, in computers adhering to the Advanced Configuration and Power Interface (ACPI) specification, system firmware populates a number of ACPI tables that characterize system hardware.

After the power-on self test and hardware initialization are complete, control passes to remote boot module 56. In one embodiment, remote boot module 56 transfers OS image with switch module and LLDP agent 24 stored on management server 12 to memory 40 of computer 16, and launches the OS. In another embodiment discussed below with reference to FIG. 5, remote boot module 56 boots from a remote SAN storage device.

The image loaded by remote boot module 56 is shown in more detail at memory 52 of FIG. 2, which is part of memory 40 of computer 16 of FIG. 1. Although the image will be described with reference to computer system 16, the discussion below is also applicable to OS image with switch module and LLDP agent 24 stored on a storage device of management server 12, and the OS image with switch module and LLDP agent 24 stored on SAN storage device 102 of FIG. 5.

The image includes OS kernel and other OS functions 58, computer network port discovery module 60, switch module 62, LLDP agent 64, MIB 66, computer network port-to-switch port association module 68, and association reporting module 70.

OS kernel and other OS functions 58 represent an operating system. In one embodiment, the Linux operating system may be used, but those skilled in the art will recognize that other operating systems may be used with embodiments of the present invention.

Computer network port discovery module 60 discovers all Ethernet ports and associated MAC addresses in computer 16. Much of this information may be available from the ACPI tables discussed above. Computer network port discovery module 60 discovers such parameters as the hardware IDs of the NICs, the number of ports provided by each NIC, the MAC address of each port of each NIC, the power capabilities of each NIC, the bus number and device number that identifies the location of each NIC in the bus topology of computer 16, and other information known in the art.

Switch module 62 configures Ethernet ports of NIC 0 46 and NIC 1 48 to function as a network switch. Switch module 62 discovers MAC address serviced by each port, and routes Ethernet packets between the ports of NIC 0 46 and NIC 1 48 based on MAC addresses.

LLDP agent 64 implements the Link Layer Discovery Protocol, and advertises at each Ethernet port of NIC 0 46 and NIC 1 48 the identity and capabilities of the switch implemented by switch module 62. Furthermore, LLDP agent 64 receives LLDP advertisements from the devices to with the ports are coupled. Accordingly, LLDP agent 64 receives information characterizing switch 14 of FIG. 1. Each port of computer 16 will receive via LLDP the system name and description of switch 14, and port name, MAC address, and description from each respective port of switch 14. MIB 66 stores information received by LLDP agent 64.

Computer network port-to-switch association module 68 uses the information stored in MIB 66, and the information discovered by computer network port port discovery module 60 to create associations that characterize the connection between each port of switch 14, and each corresponding port NIC 0 46 and NIC 1 48 of computer 16.

Finally, association reporting module 70 reports the associations created by computer network port-to-switch port association module 60 to management server 12 of FIG. 1. Association reporting module 70 includes functionality for terminating switch module 62 and LLDP agent 64, and configuring an Ethernet port of computer 16 to communicate with management server 12.

Figure 3:
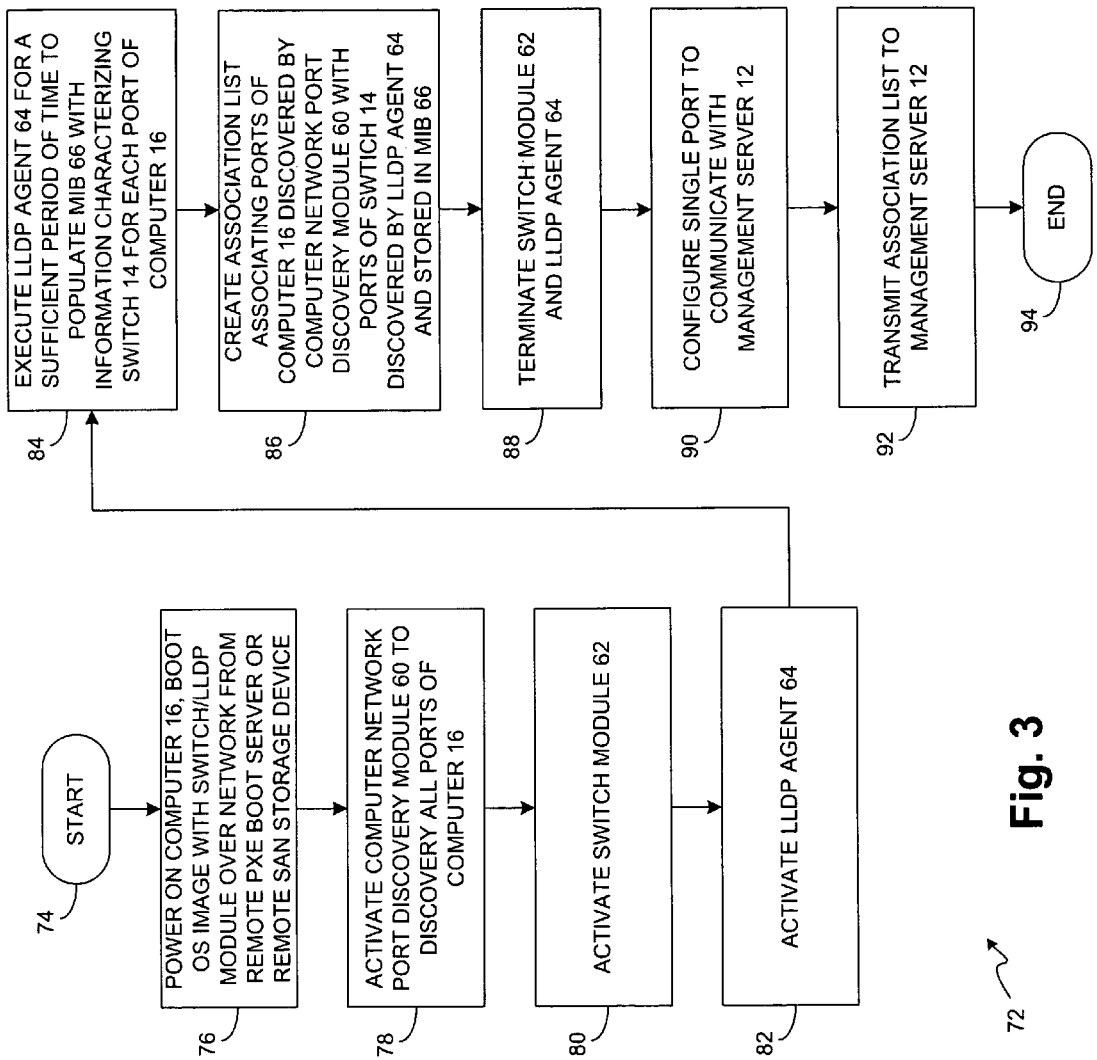
FIG. 3 shows a flow chart illustrating a process for discovering associations between ports of a computer and ports of a switch shown in FIG. 1, in accordance with embodiments of the present invention.

FIG. 3 shows a flow chart 72 illustrating a process for creating associations between the ports of computer 16 and the ports of switch 14, and transmitting the associations to management server 12. Before the process is initiated, computer 16 is installed, and Ethernet cabling is provided to attach ports of computer 16 to ports of switch 14. Furthermore, SAN cabling may be provided, as shown in FIG. 5.

The process begins at start block 74, and control passes to block 76. At block 76, computer 16 is powered on using techniques known in the art, such as pressing a power button on computer 16, or using wake-on-LAN (WOL) packets to power on computer 16 remotely. Computer 16 then uses PXE to boot from a remote PXE boot server using OS image with switch module and LLDP agent 24, or accesses a remote a SAN storage device to boot using OS image with switch module and LLDP agent 24, as shown below in FIG. 5. Control then passes to block 78.

Block 78 activates computer network port discovery module 60, which discovers all ports of computer 16, as described above. Next control passes to block 80, which activates switch module 62. Control then passes to block 82, which activates LLDP agent 64, and control passes to block 84.

At block 84, LLDP agent 64 is executed for a sufficient period of time to populate MIB 66 with information characterizing switch 14 at each port of computer 16. A typical default LLPD advertising interval is 30 seconds. However, a network administrator may select a different interval. Alternatively, block 84 may be configured to monitor the LLDP advertisements at each port, and proceed to block 86 only when needed LLDP advertisements have been received at each port. Control then passes to block 86.

Block 86 invokes computer network port-to-switch port association module 68 of FIG. 2 to create an association list that links ports of computer 16 discovered by computer network port discovery module 60 to ports of switch 14 discovered by LLDP agent 64 and stored in MIB 66. As discussed above, computer network port discovery module 60 discovers parameters such as the hardware IDs of the NICs, the number of ports provided by each NIC, the MAC address of each port of each NIC, the power capabilities of each NIC, the bus number and device number that identifies the location of each NIC in the bus topology of computer 16, and other information known in the art. LLDP agent 64 will populate MIB 66 with parameters associated with switch 14, such as a system name and a description of switch 14, and a port name, MAC address, and a description of each port of switch 14 coupled to a port of computer 16. MIB 66 may include other parameters, such as VLAN name, IP management address, system capabilities, MAC/PHY information, MDI power information, and link aggregation information.

Next, control passes to block 88, which terminates switch module 62 and LLDP agent 64, and passes control to block 90.

Figure 4:
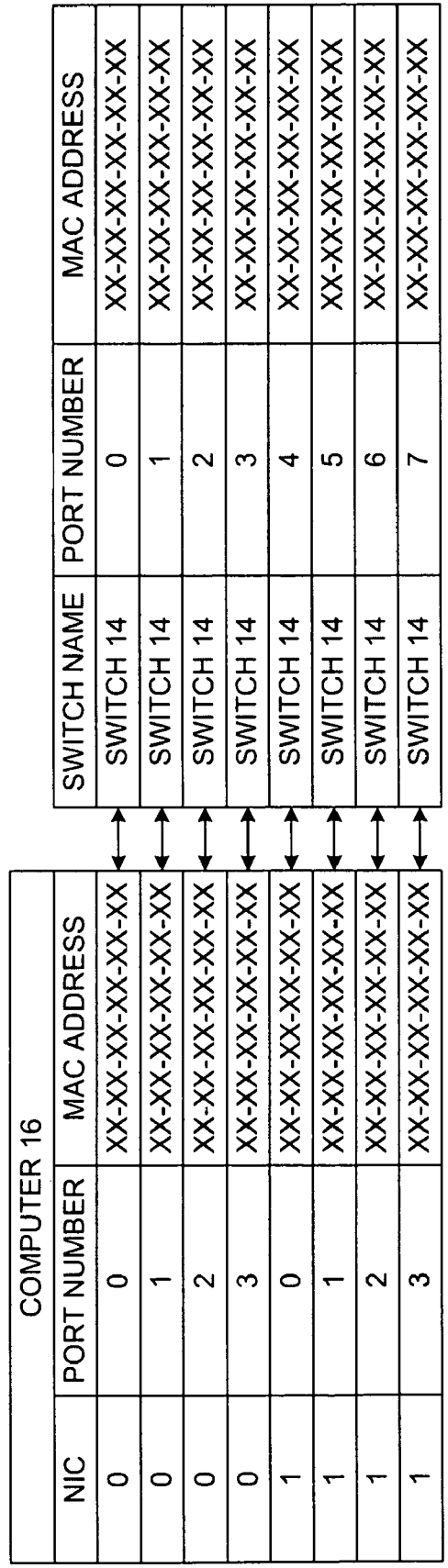
FIG. 4 shows in association list in accordance with embodiments of the present invention.

In one embodiment, the association list includes basic association information similar to the information that was gathered manually by a technician using prior art techniques. FIG. 4 shows in association list 96 in accordance with an embodiment. Association list 96 associates the NIC number, port number, and MAC address of each port of computer 16 with the switch name, port number, and MAC address of each port of switch 14 to which a port of computer 16 is coupled. In other embodiments, any information that may be used by management server 12 to provision computer 16, and is discovered by computer network port discovery module 60 and LLDP agent 64, may be included in the association list.

At block 90, a single port is configured to communicate with management server 12, and control passes to block 92. At block 92, the association list is transmitted to management server 12. Note that blocks 88, 90, and 92 are performed by association reporting module 70 of FIG. 2. Thereafter, management server 12 provisions computer 16.

FIG. 5 shows network environment 98, and illustrates another embodiment of the present invention. For simplicity, hardware and software elements have substantially the same function shown in network environment 10 of FIG. 1 are shown in network environment 98 of FIG. 5 using the same reference numerals. Accordingly, functionality associated with these elements will not be described again.

In FIG. 5, environment 98 includes SAN fabric 100, which is coupled to management server 12, SAN storage device 102, and SAN network interface 104 of computer 16. SAN storage device 102 includes OS image with switch module and LLDP agent 24. Computer 16 includes SAN network interface 104 coupled to I/O controller hub 42.

As discussed above, computer system firmware often includes modules configured to boot over an Ethernet network using the PXE protocol. Similarly, computer system firmware often includes modules configured to boot from a remote SAN storage device.

SAN storage devices may include disk arrays, tape libraries, optical jukeboxes, and other similar devices known in the art. Many SAN fabrics are known in the art, such as ATA over Ethernet (AoE), Fiber Channel Protocol (FCP) (which is a mapping of SCSI over Fiber Channel), Fiber Channel over Ethernet (FCoE), HyperSCSI (which is a mapping of SCSI over Ethernet), iSCSI Extensions for RDMA (iSER) (which is a mapping of iSCSI over InfiniBand), and iSCSI (which is a mapping of SCSI over TCP/IP). SAN network interface 104 is a SAN network interface appropriate for the SAN network implemented by SAN fabric 100.

In environment 98, a bare metal computer 16 may arrive from a vendor configured to boot from a remote SAN storage device. Accordingly, computer 16 may be installed, and Ethernet network connections are provided between computer 16 and switch 14, and SAN network connections are provided between computer 16 and SAN fabric 100. After the computer is installed, it may be booted as described above, and OS image with switch module and LLDP agent 24 is provided from SAN storage device 102 to computer 16 to boot computer 16.

In the above discussion, note that the remote boot mechanisms are used to boot computer 16 with OS image with switch module and LLDP agent 24. However, these mechanisms may still be used to boot other images. For example, in network environment 10 of FIG. 1, once management server 12 has received association list 96 of FIG. 4, management server 12 can configure PXE boot server 26 to provide a different image for subsequent boot requests from computer 16. Similarly, in network environment 98 of FIG. 5, once management server 12 has received association list 96 of FIG. 4, management server 12 can configure SAN storage device 102 to provide a different image for subsequent boot requests from computer 16.

Embodiments of the present invention further automate installation of bare metal computers in networked computer environments, such as data centers. A technician can install a bare metal computer directly from a vendor, and connect ports of the computer to ports of a switch, and possibly a SAN fabric. In the prior art, the technician had to record the connections between the Ethernet ports of the computer and ports of the switch, and enter the connection information in an automation database of a management server. Using embodiments of the present invention, the associations are discovered and transmitted to the management server without manual intervention, thereby reducing costs associated with deploying new computer systems.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of associating a plurality of computer network ports of a computer with a plurality of network device ports of a network device comprising:
    booting the computer with an operating system provided by a remote device over a network, the operating system including a switch module and a discovery agent;
    discovering computer network ports of the plurality of computer network ports;
    at the computer, activating the switch module and the discovery agent;
    utilizing the switch module and the discovery agent to discover network device ports of the plurality of network device ports to which computer network ports of the computer are coupled; and
    generating an association between discovered computer network ports and discovered network device ports such that an as-built and as-connected image of the computer and its connections is realized.

2. The method according to claim 1 wherein generating an association between discovered computer network ports and discovered network device ports of the network device includes forming an association list, the method further comprising:
    terminating the switch module and the discovery agent;
    configuring a computer network port of the plurality of computer network ports to communicate with a management server; and
    transmitting the association list to the management server.

3. The method according to claim 2 wherein the association list associates port numbers and media access control addresses of discovered computer network ports with network devices names, port numbers, and media access control addresses of discovered network device ports.

4. The method according to claim 1 wherein the discovery agent implements a Link Layer Discovery Protocol.

5. The method according to claim 1 wherein booting the computer with an operating system provided by a remote device over a network, the operating system including a switch module and a discovery agent comprises booting the computer with an operating system provided by a PXE boot server over an Ethernet network, the operating system including the switch module and the discovery agent.

6. The method according to claim 1 wherein booting the computer with an operating system provided by a remote device over a network, the operating system including a switch module and a discovery agent comprises booting the computer with an operating system provided by a remote storage area network storage device over a storage area network, the operating system including the switch module and the discovery agent.

7. Non-transitory computer readable media having computer executable program segments stored thereon, the computer executable program segments comprising:
    an operating system kernel for performing operating system functions;
    a computer network port discovery module for discovering computer network ports of a computer;
    a switch module for configuring discovered computer network ports to function as part of a network switch;
    a discovery agent for discovering network device ports of the network device to which the computer network ports are coupled, the switch module and the discovery agent being provided by a remote device over a network;
    an association module for generating an association between discovered network device ports and discovered computer network ports such that an as-built and as-connected image of the computer and its connections is realized; and
    an association reporting module, for terminating execution of the switch module and the discovery agent, configuring a computer network port of the computer to communicate with a management server, and transmitting an association list to a management server.

8. The non-transitory computer readable media according to claim 7 wherein the association module creates an association list that associates port numbers and media access control addresses of discovered computer network ports with network devices names, port numbers, and media access control addresses of discovered network device ports.

9. The non-transitory computer readable media according to claim 7 wherein the discovery agent implements a Link Layer Discovery Protocol.

10. A network environment comprising:
    a network device having a plurality of network device ports;
    a remote device for providing an image over a network to a computer seeking to boot, the image comprising:

an operating system kernel for performing operating system functions;

a computer network port discovery module for discovering computer network ports of the computer;

a switch module for configuring discovered computer network ports to function as part of a network switch;

a discovery agent for discovering network device ports of the network device to which the computer network ports are coupled; and an association module for generating an association between discovered network device ports with the discovered computer network ports such that an as-built and as-connected image of the computer and its connections is realized;

and a computer coupled to the remote device and having a plurality of computer network ports coupled to the plurality of network device ports, wherein the computer is configured to receive the image from the remote device and execute the image.

11. The network environment according to claim 10 wherein the association module creates an association list that associates port numbers and media access control addresses of discovered computer network ports with network devices names, port numbers, and media access control addresses of discovered network device ports.

12. The network environment according to claim 11 and further comprising:

a management server;

wherein the image further comprises an association reporting module for terminating the switch module and the discovery agent, configuring a computer network port of the plurality of computer network ports to communicate with the management server, and transmitting the association list to the management server.

13. The network environment according to claim 10 wherein the discovery agent implements a Link Layer Discovery Protocol.

14. The network environment according to claim 10 wherein the remote device is a PXE boot server coupled to the computer through the network device.

15. The network environment according to claim 10 wherein the remote device is a remote storage area network storage device coupled to the computer by a storage area network.

* * * * *